United States Patent [19]

Sears et al.

[11] Patent Number: 5,169,931
[45] Date of Patent: Dec. 8, 1992

[54] NITRITE-OXIDIZED LIGNOSULFONATES AND METHOD OF MAKING THE SAME AND USE OF THESE AS DISPERSANTS

[75] Inventors: Karl D. Sears, Shelton; Gerald J. Byrd, North Bend, both of Wash.

[73] Assignee: ITT Rayonier Inc., Stamford, Conn.

[21] Appl. No.: 704,448

[22] Filed: May 23, 1991

[51] Int. Cl.$^5$ ............................................. C08H 5/02
[52] U.S. Cl. .................................... 530/500; 530/501
[58] Field of Search ............................... 530/500, 501

[56] References Cited

U.S. PATENT DOCUMENTS

| | | | |
|---|---|---|---|
| 1,731,433 | 10/1929 | Onnertz et al. | 530/500 |
| 1,829,852 | 11/1931 | Darling | 162/81 |
| 4,488,907 | 12/1984 | Sarkkinen | 530/500 |

OTHER PUBLICATIONS

L. Primacheva, T. Adrianova, and V. Kirillova, Khim. Drev. (Riga), 1, 100 (1989). [Russ.].
L. Primacheva, T. Bugaeva, E. Gracheva, and N. Gladkova Gridroliz. Lesokhim. Prom., 2, 15 (1986). [Russ.].
L. Primacheva, E. Gracheva, T. Bugazeva, and F. Pokhorukov, ibid., 3, 16 (1987). [Russ.].
L. Primacheva, E. Gracheva, N. Gladkova, T. Bugaeva, and F. Pokhorukov, ibid., 7, 19 (1987). [Russ.].
L. Primacheva, T. Bugaeva, and V. Skachkov, ibid., 5, 11 (1988). [Russ.].

*Primary Examiner*—John Kight, III
*Assistant Examiner*—Richard Jones
*Attorney, Agent, or Firm*—Fred A. Keire; Thomas N. Twomey

[57] ABSTRACT

A nitrite-oxidized base lignosulfonate and a method of making the same; the method comprises providing a base lignosulfonate material and oxidizing it in the presence of sodium nitrite under alkaline conditions at a temperature greater than about 100° C.; useful products of same are dispersants for dyes and dispersants for setting materials e.g. gypsum.

25 Claims, No Drawings

NITRITE-OXIDIZED LIGNOSULFONATES AND METHOD OF MAKING THE SAME AND USE OF THESE AS DISPERSANTS

FIELD OF THE INVENTION

The present invention relates to lignosulfonate derivatives and methods for making these lignosulfonate derivatives and useful products thereof e.g. dispersants.

BACKGROUND

Previously, reactions of lignin materials involving sodium nitrite have related to its use at low temperatures in promoting diazo coupling reactions and for introducing nitro groups. Such reactions have been conducted under acidic conditions (in acid, sodium nitrite is converted to nitrous acid). While nitrous acid has been used for nitration of lignin, the prinicpal reagent used is nitric acid.

It has recently been found that one can avoid the degrading effects of nitrating lignosulfonates with nitric acid by employing mixtures of sodium nitrate and nitrite salts. These reactions are carried out in the 60°-90° C. range with a pH around 8.7-9.0. Under these reaction conditions, nitro radicals are formed and react with the lignosulfonates leading to organically bound nitrogen contents of 1.2-1.4% in the reaction product.

DESCRIPTION OF THE VARIOUS EMBODIMENTS

The present invention contemplates the production of a lignosulfonate derivative by the reaction of a base-containing lignosulfonate material with sodium nitrite. The base-containing lignosulfonate is defined by its methods of production, i.e., the pulping liquor used. The reaction comprises oxidizing the lignosulfonate in the presence of sodium nitrite under alkaline conditions. The resulting reaction product is an oxidized lignosulfonate. This reaction is typically accompanied by desulfonation and an increase in product viscosity, molecular weight and carboxyl contents. The lignosulfonates employed in the reaction are normally derived from coniferous wood species. The thus-produced lignosulfonate derivatives or streams derived from them (e.g., by ultrafiltration) may be used as e.g. gypsum dispersants or primary dye dispersants.

The reaction may be carried out with a variety of lignosulfonate starting materials, such as
spent sulfite liquor,
chemically modified (e.g., desugared, desugared-sulfonated) spent sulfite liquor,
fermented sulfite liquor
ultrafiltered material prepared from the preceding liquors and the like.

Ultrafiltered spent sulfite liquor or previously reacted reaction product thereof are purified lignosulfonates from which low molecular weight impurities have been removed by ultrafiltration. Ultrafiltration is used advantageously for the separation of high molecular weight solutes from their solvents—in this instance, lignosulfonates from wood sugars and other solutes. The specified membrane will determine the material removed, but typically materials of less than 6000 $\overline{Mw}$ (weight average molecular weight) and up to 20,000 $\overline{Mw}$ (preferably) are removed. The retentate is used in the process herein. However, it is possible to use specific fractions in the molecular weight range up to 100,000 $\overline{Mw}$ if a product of such characteristics is desired by employing appropriate membranes as it is well known in the art. Therefore, specific fractions of the lignosulfonate material can be used as desired. Suitable lignosulfonate starting materials are base-containing lignosulfonates wherein the base is selected from sodium, calcium, magnesium or ammonium, including, for example, the following lignosulfonates:

ammonia-base sulfite pulping liquor of coniferous wood species found in the Pacific Northwest,
sodium-base sulfite pulping liquor, e.g. the above named wood species,
calcium- or magnesium-base sulfite pulping liquor, preferably of the same wood species.

Other sources of sulfite liquors of the above type that maybe useful are bagasse, deciduous trees, mixtures of the foregoing, etc.

It has been found that while kraft black liquor and derived liquors have been tried, these offer no advantages.

The present invention is particularly suitable to lignosulfonates from spent sulfite pulping liquors, i.e., pulping liquors containing sulfur dioxide, sulfurous acid and bisulfite, and especially those in which calcium, sodium, magnesium and ammonia have been used as the source of the base for making bisulfite. Kraft liquors are characterized by alkaline pulping with sodium hydroxide and sodium sulfide as the major cooking chemical. Preferred lignosulfonate starting materials are sodium-, calcium-, magnesium-, and ammonia-base lignosulfonates. Of these, the preferred species is the first.

Sodium-base lignosulfonate materials are commercially available from ITT Rayonier, Stamford, Conn. as ULTRAMIX (an ultrafiltered, about 90% pure lignosulfonate, derived from desugared-sulfonated spent sulfite liquor), RAYMIX (a chemically desugared-sulfonated material derived from spent sulfite liquor), and RAYLIG (an unmodified spent sulfite liquor material). Calcium-base lignosulfonate material is also available from Georgia Pacific Corporation as LIGNOSITE (fermented spent sulfite liquor). Ammonia-base lignosulfonate material is available from ITT Rayonier as ORZAN AL-50 1 (an unmodified spent sulfite liquor material).

While sodium nitrite is the preferred oxidizing agent in the reaction, other nitrite salts (e.g., potassium) may also be used. Although the reaction may be conducted to give useful products with a mixture of sodium nitrite and sodium nitrate, it is preferred to use merely sodium nitrite.

The reaction of these lignosulfonate starting materials with sodium nitrite is conducted at temperatures above about 100° Celsius, desirably at a reaction temperature greater than about 150° C. and preferably at temperatures from about 165° C. to about 170° C. and even higher, e.g. up to 200° C. Greater than atmospheric pressure is used to achieve these temperatures since the reaction medium is an aqueous system. The reaction is run at a basic pH (from above about 7 to about 14) and preferably at a pH from about 9 to about 10. The reaction time is from about 5 to about 600 minutes, with about forty-five (45) minutes being preferred. Time to temperature, i.e., the time taken to reach the desired reaction temperature, is from five (5) minutes to five (5) hours with about twenty (20) to thirty (30) minutes being preferred.

Sodium nitrite is used in an amount from about 4.0 to 20.0% by weight of lignosulfonate solids with about 7.5% by weight being preferred. The lignosulfonate solids determinations are typically carried out by heating about one (1) gram of lignosulfonate material for 16 hours at 105° C. or 90 minutes at 120° C. to determine moisture loss. Lignosulfonate material concentration may be from about 10% to about 70% (preferably 25% to 40%) on a total solution weight basis. The starting lignosulfonate solution solids concentration is preferably adjusted so that after reaction with sodium nitrite the viscosity of the final product at 20° C. remains at about 100 centipoise (cps) or less (Brookfield Viscometer, Model LVT, #2 spindle). As more nitrite is used in the reaction, a reduced starting solution solids content should be used in order to obtain a final product of acceptable viscosity within the above range. The desired viscosity of the final product is from about 60 to about 100 centipoise.

The nitrite oxidation of lignosulfonates has the potential to result in desulfonation of organically bound sulfonate groups with the generation of inorganic sulfate groups. In the nitrite oxidation of various sodium-base lignosulfonates, a loss of about 0.3% to 1.8% of organically bound sulfur may be observed; with calcium-base lignosulfonates about 1.2% to about 1.8%; and with ammonia-base lignosulfonates about 0.6% to about 0.9%. (See Table 6.) The reaction achieves its desired oxidation results without incorporating significant amounts of nitrogen into the lignosulfonate materials. The increase in incorporated organically bound nitrogen in the materials ranges from 0.0% to 0.5% maximum on a weight basis.

The products of the reaction of the present invention provide improved dispersion benefits, particularly as gypsum dispersants and as primary dye dispersants. A nitrite-oxidized ultrafiltered sodium-base lignosulfonate prepared from ULTRAMIX (TM) provides particularly advantageous properties as a primary dye dispersant, particularly with respect to milling efficiency, foam build-up and fabric staining. With respect to gypsum dispersion their performance is superior to the starting materials used in their preparation such as ULTRAMIX or RAYMIX® from ITT Rayonier, and their performance approaches that of the more expensive, high performance naphthalene sulfonates, such as DILOFLO® GL sold by Henkel Corporation. As a primary dye dispersant the nitrite oxidized lignosulfonate prepared from ULTRAMIX is superior to kraft lignin derived materials, such as REAX 85A (a lignosulfonate derived by sulfonating kraft lignin) available from Westvaco, New York, N.Y.

In order to provide a ready overview of the materials used, their trade names, and some of the nitrite oxidation products prepared from them and described herein the following TABLE A is supplied:

TABLE A

| Trade Name of Starting Material and Product Prepared | NITRITE-OXIDIZED BASE-CONTAINING LIGNOSULFONATES (DERIVED FROM SPENT SULFILTE LIQUOR) | | | | | Base | | |
|---|---|---|---|---|---|---|---|---|
| | Ultrafiltered (after oxidation) | Ultrafiltered (before oxidation) | Fermented (before oxidation) | Sulfonated (before oxidation) | Desugared (before oxidation) | NH₄ | Na | Ca |
| ORZAN AL-50 | — | — | — | — | — | | — | — |
| LOT 3D, Ex. 3 | | | | | | | | |
| LIGNOSITE | — | | — | | — | | — | — |
| Lot 2B, Ex. 2 | — | | | | | | — | — |
| RAYLIG | | — | — | — | | | — | — |
| Lot 5B, Ex. 5 | — | — | — | — | | | — | — |
| RAYMIX | — | | | | | | | — |
| Lot 6B, Ex. 6 | — | | | | | | | — |
| ULTRAMIX | — | | | | | | — | |
| Lot 1A, Ex. 1 | — | | | | | | — | |

If desired, the reaction product may further be ultrafiltered. This is particularly advantageous in obtaining high quality gypsum dispersants from nitrite oxidized spent sulfite liquor prepared, for example, from ORZAN AL-50.

A series of experiments were conducted by reacting sodium nitrite with
1. sodium-base lignosulfonates (the ULTRAMIX product from ITT Rayonier) (Example 1A-C);
2. calcium-base lignosulfonates (the LIGNOSITE product from Georgia Pacific) (Example 2);
3. ammonia-base lignosulfonates (the ORZAN AL-50 product from ITT Rayonier) (Example 3) and
4. kraft lignin (the REAX 85A product from Westvaco) (Example 4), Examples 1 through 3 are in accordance with the present invention. The reaction products were evaluated in comparative dispersion tests (Table 5).

Primary dye dispersion tests are presented for nitrite oxidized ULTRAMIX further described herein.

Several reactions with calcium-base lignosulfonates were carried out using different starting amounts of solution solids.

Reactions with ammonia base lignosulfonates were carried out using different starting amounts of solution solids to find the optimum level with regard to final product viscosity.

One of the reaction products (Lot 3A) was also ultrafiltered and the retentate tested for its dispersant utility.

Analytical data relating to levels of desulfonation experienced as a result of nitrite oxidation of various base containing lignosulfonates are in Table 6.

The following examples are intended to illustrate the invention but not to limit its scope.

EXAMPLE 1

Reaction of Sodium Base Lignosulfonates ULTRAMIX with Sodium Nitrite

A. Preparation of Lot 1A

ULTRAMIX solution (2763 g: percent total solids was 30.43 or 870 g of solids—oven dry basis) was diluted to 3000 g with water. This yielded a solution that was 29.0% total solids. To this solution while stirring was added 65.25 g of sodium nitrite (99% purity). This amount represents 7.5% of sodium nitrite based on Ultramix starting solids. The pH was then adjusted to pH 10.0 with 50% caustic (sodium hydroxide). The mixture was transferred to a small autoclave vessel (4 liter). While stirring, the autoclave contents were heated to 165° C. (20 minutes to temperature) and then maintained at about 165° C. for 45 minutes. The reaction was ended by running cold water through the autoclave jacket. The contents were removed from the autoclave. The viscosity (at 20° C.), pH, and oven dry solids were obtained. Results appear in Table 1.

B. Lot 1B

The reaction was conducted in a similar manner as for Lot 1A, except the ULTRAMIX solution solids after dilution to 3000 g was 34.0% (1020 g of solids). The amount of sodium nitrite added was 1.0% based on Ultramix solids, or 10.2 grams. Results appear in Table 1.

C. Lot 1C

The reaction was conducted in a similar manner as for Lot 1A, except the ULTRAMIX solution solids, after dilution to 3000 g, was 26.0% (780 g of solids). The amount of sodium nitrite added was 20.0% based on ULTRAMIX solids, or 156 grams. Results appear in Table 1.

The reaction parameters for these experiments are tabulated as follows in Table 1:

TABLE 1

Reaction of Sodium-Base Lignosulfonate, ULTRAMIX with Sodium Nitrite

| Product No. | % Sodium Nitrite[1] | Starting Material | | Reaction Product | | |
|---|---|---|---|---|---|---|
| | | Solids[2], % | pH | Solids, % | pH | Viscosity[3], cps |
| Lot 1A | 7.5 | 29.0 | 10.0 | 29.9 | 9.4 | 80 |
| Lot 1B | 1.0 | 34.0 | 10.0 | 34.1 | 9.2 | 85 |
| Lot 1C | 20.0 | 26.0 | 10.0 | 28.7 | 9.4 | 555 |

[1]Amount added in % based on weight of lignosulfonate solids.
[2]Starting content of lignosulfonate solids in solution (weight basis) before addition of solid NaNO₂ and 50% NaOH.
[3]Viscosity of final reaction product at 20° C. using a Brookfield Viscometer (Model LVT, #2 Spindle).

In the reaction of ULTRAMIX lignosulfonate with sodium nitrite (the last available from BASF) using 20% sodium nitrite by weight of ULTRAMAX solids (Lot 1C), the starting solution solids selected was 26%. While it has been observed that increasing nitrite levels lead to products of increased viscosity, it was believed that this would be a satisfactory level to attain a target viscosity of from 60 to 100 centipoise. This was not enough of a reduction since final product viscosity was around 500 cps (Table 1). The resulting nitrite-oxidized lignosulfonate was, however, a very good performing product based on gypsum dispersion performance (Table 5). Reducing starting material solids content even more would further reduce product viscosity. It is desirable to have the solution viscosity after preparation at 100 cps (at 20° C.) or less since the liquid product gradually increases in viscosity with time. Levels higher than 100 cps (at 20° C.) reduce the products useful shelf life below practical limits.

While the product prepared using 1.0% sodium nitrite had an acceptable viscosity profile (Table 1), it was a poor gypsum dispersant compared to the 7.5% product (Lot 1A), and considerably poorer than Diloflo GL (Henkel Corporation) the comparison material (Table 5) of commercial choice.

The most desirable product in this series (Table 1) with regard to gypsum dispersant performance and viscosity properties is Lot 1A.

EXAMPLE 2

Reaction of Calcium-Base Lignosulfonates with Sodium Nitrite: Lots 2A and 2B (Table 2)

A. Preparation of Lot 2B

LIGNOSITE lignosulfonate [1496 g; percent total solids was 50.19 or 750.8 g O.D. (oven dry solids basis)] was diluted with water to bring the solution to 2,086 grams. This yielded a solution that was 36% total solids. Sodium hydroxide solution (50%) was added to bring the pH above 7 and 56.3 g of sodium nitrite of 99% purity (available from BASF) was added with stirring. This amount represents 7.5% of sodium nitrite based on LIGNOSITE solids. The pH was then adjusted to 10.0 with 50% sodium hydroxide. The material was transferred to a small autoclave (4 liter). The autoclave contents were heated with stirring to 165° C. (25 to 30 minutes elapsed in reaching that temperature) and maintained there for 45 minutes. Maximum pressure reached in this reaction was about 95 pounds per square inch gauge. The reaction was ended by running cold water through the autoclave jacket. Then the contents were removed from the autoclave. The viscosity at 20° C. was 120 cps, the pH was 8.02 and the percent total solids was 36.10.

In the first reaction of sodium nitrite with LIGNOSITE lignosulfonate (Lot 2A), the starting solids content of the LIGNOSITE was 34.0% on a weight to volume basis. This resulted in a lower viscosity product at 20° C. than desired (35 cps actual compared to about 60-100 cps desired.) However, there were definite improvements in gypsum dispersant performance compared to unreacted LIGNOSITE itself (particularly at the 0.2% dosage rate level where dispersion efficiency increased to 86% that of the DILOFLO GL naphthalene sulfonate compared to only 49% for unreacted LIGNOSITE itself.)

Increasing the starting solids content to 36.0% (Lot 2B) led to a reaction product with viscosity nearer that desired (120 centipoise actual). This product had better performance at the 0.1% level in gypsum dispersion tests (see Table 5), but still not as good as nitrite oxidized ULTRAMIX (e.g. Lot 1A, Tables 1 and 5). It was observed that the gypsum set retardation, as measured by set time, of Lot 2B exceeded that of both unreacted LIGNOSITE and Lot 2A (which was prepared at a lower starting solids level). The reaction parameters for those experiments were as shown in Table 2 below:

TABLE 2

Reaction of Calcium-Base Lignosulfonate with 7.5% Sodium Nitrite

| Product No. | Starting Material | | Reaction Product | | |
|---|---|---|---|---|---|
| | Solids[1], % | pH | Solids, % | pH | Viscosity[2], cps |
| Lot 2A | 34.0 | 10.0 | 34.1 | 7.3 | 35 |
| Lot 2B | 36.0 | 10.1 | 36.1 | 8.0 | 120 |

[1]Starting content of lignosulfonate solids in solution before addition of solid NaNO₂ and 50% NaOH.
[2]Viscosity of final reaction product at 20° C., taken within 4 hours after reaction using a Brookfield Viscometer (Model LVT, #2 Spindle).

EXAMPLE 3

Reaction of Ammonia-Base Lignosulfonates with Sodium Nitrite: Lots 3A, 3B and 3C Concentrated ammonia base spent sulfite liquor (ORZAN AL-50) lignosulfonate from ITT Rayonier (Stamford, Conn.) of 1818 g; and a total amount of 51.15% total solids, (or 930 g of solids on an oven dry basis) was diluted with water to bring the solution weight to 3000 g, producing a solution solids content of 31%. A sodium hydroxide solution (50%) was added to bring the pH above 7, and then sodium nitrite was added (69.75 g, or 7.5% based on lignosulfonate solids.) The pH was then adjusted to 9.0 with 50% sodium hydroxide solution. The solution was transferred to a small autoclave where it was heated at 165°–168° C. for 45 minutes. (Time to reach that temperature was about 20 minutes.) Whenever the pressure of the autoclave reached about 130 pounds per square inch (gauge), it was relieved down to 100 pounds per square inch; this occurred about 4 times. The final reaction product had: viscosity at 20° C. of 148 centipoise, a pH of 4.3 and % total solids of 30.1. The reaction parameters were as listed in Table 3:

TABLE 3

Reaction of Ammonia-Base Lignosulfonate with 7.5% Sodium Nitrite

| | Starting Material | | Reaction Product | | |
|---|---|---|---|---|---|
| Product No. | Solids[1], % | pH | Solids, % | pH | Viscosity[2], cps |
| Lot 3A | 35.0 | 9.0 | 34.0 | 4.3 | 3650 |
| Lot 3B | 30.0 | 9.0 | 29.2 | 4.3 | 58 |
| Lot 3C | 31.0 | 9.0 | 30.1 | 4.3 | 148 |

[1]Starting content of lignosulfonate solids in solution before addition of solid NaNO₂ and 50% NaOH.
[2]Viscosity of final reaction product at 20° C. taken within 4 hours after reaction, using a Brookfield Viscometer (Model LVT, #2 and #3 spindles).

Lot 3C product was nearer the desired 100 centipoise viscosity level. (It is believed that about 30.5% starting solids would put one at the desired 100 centipoise level at 20° C.) In gypsum dispersion testing this material did very well compared to the ammonia base lignosulfonate starting material itself, and reasonably well compared to DILOFLO GL naphthalene sulfonate (see Table 5). The gypsum set retardation, as measured by set time, was also quite low relative to ORZAN CG sodium lignosulfonate (Table 5).

TABLE 3A

Ultrafiltration[1] of Nitrite-Oxidized Ammonia-Base Lignosulfonate

| Ultrafiltered Product No. | Feed Solids, % | Concentration Ratio[2] | Retentate Recovery, % |
|---|---|---|---|
| Lot 3D | 8.05 | 4.5 | 62.1 |

[1]At 60° C.
[2]Starting volume divided by retentate volume.

The ultrafiltration of Lot 3C to obtain Lot 3D was carried out on a DDS (De Danske Sukkerfabrikker—The Danish Sugar Corporation) Lab 20 unit at 60° C. using GR-61PP membranes (polysulfone membranes with a 20,000 molecular weight cutoff—manufactured by and available from DDS). Lot 3C (800 g of solids) was first pH adjusted to 9.0 with 50% sodium hydroxide and then the starting solution feed solids were adjusted to 8.05%. Pressures during ultrafiltration were: 5.5–6.0 bars inlet, 4.0–4.5 bars outlet. After ultrafiltering to a 4.5 concentration ratio (starting volume divided by retentate volume), the retentate fraction (Lot 3D) contained 497 g of total solids (62.1% of the starting solids); the permeate fraction contained 276 g of total solids (34.5% of the starting solids). The amount of starting solids lost during the ultrafiltration was only 3.4% or about 27 g.

The results show that at least 62% of the starting material solids were retained after ultrafiltration, and that it performed very well relative to the DILOFLO GL naphthalene sulfonate in gypsum dispersion tests (see Table 5). In fact, it appeared to actually outperform the DILOFLO GL product at the 0.1% level. The gypsum set retardation was far less for the material after ultrafiltration than before. It appears that this material also outperforms nitrite oxidized ULTRAMIX (Lot 1A) from Example 1 above, in both gypsum dispersion and set retardation.

Nitrite oxidation of sodium base spent sulfite liquor (RAYLIG) under a set of desirable conditions (39.0% starting solids and pH of 10.0 using 7.5% sodium nitrite) yields material which when ultrafiltered to a concentration ratio of 5.0 gives a retentate product that also performs very well in gypsum tests relative to DILFLO GL. However, the performance does not equal that obtained from Lot 3D (ultrafiltered, nitrite oxidized ammonia base spent sulfite liquor as described above).

In all the nitrite oxidation reactions with ammonia base lignosulfonates the starting pH was adjusted to 9.0 rather than 10 (which, generally, is the desired starting pH for lignosulfonate starting materials). This change was made to reduce the generation of ammonia vapors. As a result of this lower starting pH, the final product pH was lower than that for other nitrite-oxidized lignosulfonate products prepared in accordance with the present invention. The reaction product was on the acid side (pH of 4.3, Table 3).

EXAMPLE 4

Reaction of Kraft Lignin with Sodium Nitrite: Lot 4A

Kraft lignin (such as REAX 85A kraft lignin from Westvaco) in an amount of 1683 grams of a 32.11% total solids content or 540.4 grams (oven dry) was diluted to 2078.5 grams of total weight with water (a solution solids content of 26.0%) (Lot 4A, Table 6.) To this solution, of pH 8.2, was added sodium nitrite (40.53 grams or 7.5% of sodium nitrite based on REAX 85A solids.) Sodium hydroxide solution (50%) was added to bring the pH to 10.0. The solution was transferred to the previously described autoclave and heated to 165° C. (50 minutes to reach this temperature) and maintained there for 45 minutes. The maximum pressure attained during reaction was 100 pounds per square inch (gauge). Final product properties were: pH of 9.4, viscosity at 20° C. of 90 Cps and % total solids of 26.82. Reaction parameters are summarized as follows in Table 4:

TABLE 4

Reaction of Kraft Lignin, REAX 85A with 7.5% Sodium Nitrite

| | Starting Material | | Reaction Product | | |
|---|---|---|---|---|---|
| Product No. | Solids[1], % | pH | Solids, % | pH | Viscosity[2], cps |
| Lot 4A | 26.00 | 10.0 | 26.8 | 9.4 | 940 |

[1]Starting content of lignosulfonate solids in solution before addition of solid NaNO₂ and 50% NaOH.
[2]Viscosity of final reaction product at 20° C., taken within 4 hours after reaction, using a Brookfield Viscometer (Model LVT, #3 spindle).

It was of interest to see if nitrite oxidation of a kraft lignin derived material would lead to any improvements in gypsum dispersion performance as had been observed with sodium-, calcium-, and ammonia-base lignosulfonate materials. It was observed that its level of reactivity was very low since it took a much longer time to heat up to temperature compared to sodium-, calcium-, and ammonia-base lignosulfonates (e.g., 45 minutes compared to 20 for sodium base lignosulfonates).

While the viscosity was observed to increase during the reaction, no improvement in gypsum dispersion performance was observed (see Table 5.) The level of dispersion actually decreased at the 0.2% dosage rate level. It is noteworthy that the dispersion performance of the unreacted REAX 85A kraft lignin starting material itself is good compared to DILOFLO GL napthalene sulfonate; however it has very poor gypsum set retardation characteristics compared to accepted commercial products for this application (e.g. ORZAN CG by ITT Rayonier).

Nitrite oxidations of kraft black liquor itself that were carried out showed no beneficial performance effects whatsoever in gypsum dispersion tests. In fact results were the same for reacted and unreacted materials.

Gypsum Dispersion Testing

The gypsum dispersant product and set retardation tests were run using techniques paralleling appropriate ASTM procedures.

In gypsum dispersion tests, water-gypsum mixtures are made with and without added dispersants, but with a constant amount of water, and poured out onto a glass plate. The increase in the size of the resulting patty containing the dispersant, over that without, is a measure of the efficiency of the dispersant.

In these tests, the standard amount of gypsum stucco ($CaSO_4 \cdot \frac{1}{2}H_2O$—calcium sulfate hemihydrate—supplied by Domtar, Long Beach, Cal.; combined water content, 5.4–6.0%; particle size, 5.4–5.9 microns) used is 50 g; the amount of dispersant used in the tests, typically, is 0.1 and 0.2% of product solids based on stucco weight, or 0.050 and 0.100 g, respectively.

The efficiency of the dispersant product tested is calculated by dividing the average diameter of two patties made with dispersant by the average diameter of the two patties without, multiplying by 100, and subtracting 100 to give a percentage. For example, if the control patties (i.e., no dispersant added) have an average diameter of 87 millimeters and the patties made with dispersant average 104 millimeters, the efficiency for the dispersant is: $(104/87 \times 100) - 100 = 20\%$.

In the following Table (5), the dispersion efficiency of each product is compared to that of DILOFLO GL (Henkel Corporation—a high performance naphthalene sulfonate sold as a gypsum dispersant for gypsum board manufacture). The dispersion effiencies reported in "% compared to DILOFLO GL" are obtained by dividing the dispersion efficiency of the product tested by the dispersion efficiency determined for DILOFLO GL, and then multiplying by 100. Dispersion efficiences for DILOFLO GL were measured on the same date each product listed in Table 5 was tested.

For example, if the dispersion efficiency of a product at 0.1% dosage rate is 22%, and that of DILOFLO GL is 25%, "Dispersion Efficiency, % Compared to DILOFLO GL" is: $22/25 \times 100 = 88$.

The set retardation test is a modified Vicat method (similar to ASTM C 472-68-9,10) in which 50 grams of stucco is added to an appropriate amount of water or water-dispersant mixture in a foam cup. Timing is started with addition. After mixing vigorously, the mixture is allowed to sit until judged to be at the time of initial set. The Vicat apparatus consists of a one millimeter diameter needle backed by a 300 g weight, all supported by a frame. The needle is lowered until it just touches the surface of the slurry, then allowed to drop. Until initial hydration has occurred, the needle will go clear to the bottom of the cup. The point where the slurry begins to support it above the bottom of the cup is considered to be the set time. The time is recorded. Tests are conducted in duplicate. The set times were carried out using 0.2% of product solids based on stucco, or 0.100 g.

The set times in Table 5 are recorded as the "% above control". These values are obtained by dividing the set time for the stucco with dispersant by the set time of the stucco without dispersant (i.e., the control), multiplying by 100, and then subtracting 100.

For example, if the stucco with dispersant sets in 1500 seconds, and the stucco without dispersant (i.e., the control) sets at 1000 seconds, the set time, expressed as "% above control" is: $(1400/1000 \times 100) - 100 = 40$.

Set time results are affected by ambient moisture and temperature levels, so values can vary substantially from one day to the next; however, results relative to a standard run each time tend to be similar. That is why ORZAN CG, a sodium lignosulfonate gypsum dispersant sold by ITT Rayonier, was run as a set retardation standard whenever set times were determined on the product whose test results are recorded in Table 5.

TABLE 5

Comparative Gypsum Test Results

| Product No. | | Dispersion Efficiency, % Compared to DILOFLO GL[1] Dosage Rate[2] | | SET TIME (% above control[3]) |
|---|---|---|---|---|
| | | 0.1% | 0.2% | |
| Sodium Base Lignosulfonate, ULTRAMIX/Sodium Nitrite Reaction Products | | | | |
| 1 | Starting Material (ULTRAMIX lignosulfonate) | 68 | 67 | — |
| 2 | Lot 1A | 92 | 92 | 19 |
| 3 | Lot 1B | 83 | — | — |
| 4 | Lot 1C | 108 | 97 | — |
| 5 | Orzan CG lignosulfonate[4] | — | — | 30 |
| Calcium Base Lignosulfonate, LIGNOSITE/Sodium Nitrite Reaction Products | | | | |
| 6 | Starting Material LIGNOSITE lignosulfonate | 60 | 49 | 36 |
| 7 | Lot 2A | 68 | 86 | 36 |
| 8 | Lot 2B | 76 | 86 | 43 |
| 9 | ORZAN CG lignosulfonate[4, 5] | | | 48 |
| Ammonia Base Lignosulfonate, ORZAN AL-50/Sodium Nitrite Reaction Product | | | | |
| 10 | Starting Material (ORZAN AL-50 lignosulfonate) | 46 | 56 | 14 — |
| 11 | Lot 3A | 73 | 86 | 19 — |
| 12 | Lot 3B | 58 | 83 | 17 — |
| 13 | Lot 3C | 78 | 89 | — 5 |
| 14 | ORZAN CG lignosulfonate[4] | — | — | 39 34 |
| Ultrafiltered Ammonia Base Lignosulfonate, ORZAN AL-50/ Sodium Nitrite Reaction Products | | | | |
| 15 | Lot 3C (feed) | 78 | 89 | 13 |
| 16 | Lot 3D | 104 | 97 | 8 |
| 17 | ORZAN CG lignosulfonate[4] | | | 34 |
| Kraft Lignin, REAX 85A/Sodium Nitrite Reaction Products | | | | |
| 18 | Starting Material (REAX 85A Kraft lignin Example 4) | 88 | 94 | 75 |
| 19 | Lot 4A | 88 | 78 | 65 |

TABLE 5-continued

Comparative Gypsum Test Results

| Product No. | | Dispersion Efficiency, % Compared to DILOFLO GL[1] Dosage Rate[2] | | SET TIME (% above control[3]) |
|---|---|---|---|---|
| | | 0.1% | 0.2% | |
| 20 | Orzan CG lignosulfonate[4] | — | — | 39 |
| | Sodium Base Lignosulfonate, RAYLIG/Sodium Nitrite Reaction Product (Example 5, below) | | | |
| 21 | Starting Material (RAYLIG lignosulfonate) | 42 | 52 | — |
| 22 | Lot 5A-2[6] | 60 | 78 | — |
| | Ultrafiltered Sodium Base Lignosulfonate, RAYLIG/Sodium Nitrite Reaction Product | | | |
| 23 | Lot 5B | 97 | 89 | 19 |
| 24 | Orzan CG Lignosulfonate[4] | — | — | 41 |
| | Sodium Base Lignosulfonate, RAYMIX/Sodium Nitrite Reaction Product (Example 6, below) | | | |
| 25 | Starting material (Raymix lignosulfonate) | 63 | 66 | — |
| 26 | Lot 6A | 100 | 88 | 47 |
| 27 | Orzan CG[4] | — | — | 40 |
| | Ultrafiltered Sodium Base Lignosulfonate, RAYMIX/Sodium Nitrite Reaction Product (Example 6, below) | | | |
| 28 | Lot 6B | 104 | 107 | 26 |

[1] A naphthalene sulfonate sold by Henkel Corp. as a high performance dispersant for gypsum board manufacture.
[2] Percent product solids on stucco.
[3] Carried out at a dosage rate of 0.2% product solids based on stucco. The control is the set time of stucco with no dispersant present.
[4] A sodium lignosulfonate gypsum dispersant sold by ITT Rayonier and used as a set retardation standard for this study.
[5] These values obtained on a different test date from the others in this section (causing change in properties).
[6] Prepared in a manner similar to Lot 5A, Example 5.

EXAMPLE 5

Reaction of Sodium Base Lignosulfonate, RAYLIG, with Sodium Nitrite

Lot 5A:

Concentrated sodium base spent sulfite liquor (RAYLIG, 2265 g; 51.7% total solids, or 1,170 g of solids on an oven dry basis) was diluted with water to bring the solution weight to 3000 g, producing a solution solids content of 39.0%. A sodium hydroxide solution (50%) was added to bring the pH above 7, and then sodium nitrite was added (87.75 g, or 7.5% based on lignosulfonate solids). The pH was then adjusted to 10.0 with 50% sodium hydroxide solution, and the solution transferred to the small autoclave where it was heated at 165° C. for 45 minutes (time to temperature=20 minutes). This was a vigorous reaction in the early stages and pressure was released several times to keep the pressure below 150 psi. The final reaction product had a viscosity of 102 cps at 20° C., a pH of 5.7 and a percent total solids content of 36.9.

Product prepared in the above manner performed much better in gypsum dispersant tests than the starting material (RAYLIG; see Table 5). The performance at the 0.2% level was notably better (78% dispersion efficiency relative to DILOFLO GL, compared to 52% for unreacted RAYLIG).

If product prepared in this manner is ultrafiltered at 60° C. using a polysulfone membrane GR-61PP (described above) to a concentration ratio of 4.75 (feed solids of 9.0% with pH of 9.0), a retentate product is recovered that performs very well compared to DILOFLO GL. A product prepared in this way, Lot 5B, had a dispersion efficiency relative to DILOFLO GL of 97% (see Table 5) at the 0.1% dosage rate; the set retardation of this product was quite low compared to set retardation of the Orzan CG standard (at least 50% less retarding at the 0.2% dosage rate used in the test).

EXAMPLE 6

Reaction of Sodium Base Lignosulfonate, RAYMIX, with Sodium Nitrite

Lot 6A

A solution of RAYMIX lignosulfonate (2273 g; 46.2% total solids, or 1050 g of solids) was diluted with water to bring the solution weight to 3000 g. This yields a solution that is 35% in total solids content. To this material was added, with stirring, sodium nitrite (78.75 g, or 7.5% based on lignosulfonate solids). The pH was then adjusted to 10.0 with 50% sodium hydroxide solution, and the solution transferred to the small autoclave where it was heated to 165° C. (20 minutes to temperature) and maintained there for 45 minutes. Maximum pressure reached during the reaction was about 120 psi. The final reaction product had a viscosity at 20° C. of 87.5 centipoise, pH 8.8, and a total solids of 34.7%.

Product prepared in this manner had excellent gypsum dispersion properties. At the 0.1% dosage level, the material had a gypsum dispersion efficiency that showed it to be equal to DILOFLO GL (see Table 5). This was far better than unreacted RAYMIX lignosulfonate itself, and also better than any nitrite oxidized non-ultrafiltered lignosulfonate product prepared as described herein. The set retardation properties are poor when compared to all of the other products. The retardation properties as determined by set time were higher than for ORZAN CG itself (47% compared to 40% for ORZAN CG).

Ultrafiltering the material to a 4.8 concentration ratio at 60° C. on the GR-61PP a membrane as described in Example 5 (feed solids content of 9.9% with pH of 9.0; retentate recovery of 48.1%) gave material (Lot 6B) with better gypsum dispersion properties than DILOFLO GL at both dosage levels tested. The retardation properties were definitely better than for the non-ultrafiltered product—reduced to about 65% that of Orzan CG at the 0.2% dosage level employed in this test (see Table 5).

In order to determine the extent of desulfonation experienced in the nitrite-oxidation reactions discussed here, appropriate sulfur analyses were carried out and these results appear in the following Table 6:

TABLE 6

SULFUR ANALYSIS

| Product No. | Sulfur % | Sulfate (as Sulfur) % | Org. Bound Sulfur % |
|---|---|---|---|
| Sodium Base Lignosulfonate, ULTRAMIX/Nitrite Reaction Products | | | |
| ULTRAMIX (unreacted) | 6.92 | 0.47 | 6.45 |
| Lot 1A-2 | 6.41 | 1.38 | 5.03 |
| Calcium Base Lignosulfonate, LIGNOSITE/Nitrite Reaction Products | | | |
| LIGNOSITE (unreacted) | 6.75 | 0.50 | 6.25 |
| Lot 2A | 5.97 | 0.92 | 5.02 |
| Lot 2B | 5.44 | 0.99 | 4.45 |
| Ammonia Base Lignosulfonate, ORZAN AL-50/Nitrite Reaction Products | | | |
| ORZAN-AL-50 (unreacted) | 5.42 | 0.65 | 4.77 |

TABLE 6-continued

SULFUR ANALYSIS

| Product No. | Sulfur % | Sulfate (as Sulfur) % | Org. Bound Sulfur % |
|---|---|---|---|
| Lot 3A | 5.18 | 1.21 | 3.97 |
| Lot 3B | 5.42 | 0.95 | 3.87 |
| Lot 3C | 5.45 | 1.30 | 4.15 |
| *Kraft Lignin, REAX 85A/Nitrite Reaction Products* | | | |
| REAX 85A (unreacted) | 3.67 | 0.77 | 2.90 |
| Lot 4A | 3.66 | 0.93 | 2.73 |
| *Sodium Base Lignosulfonate, RAYLIG/Nitrite Reaction Product* | | | |
| RAYLIG (unreacted) | 5.36 | 0.57 | 4.79 |
| Lot 5A-3 | 5.42 | 0.90 | 4.52 |
| *Sodium Base Lignosulfonate, RAYMIX/Nitrite Reaction Product* | | | |
| RAYMIX (unreacted) | 7.57 | 0.50 | 7.07 |
| Lot 7A | 7.39 | 1.59 | 5.80 |

[1]Prepared in a manner analogous to Lot 1A, Example 1A.
[2]Prepared in a manner analogous to Lot 5A, Example 5.

In the reactions with LIGNOSITE calcium-base lignosulfonate, a maximum of about 1.8% of organically bound sulfur was lost under the most optimum conditions employed (Lot 2B, Table 6). With ULTRAMIX, the level of organically bound sulfur lost under optimum conditions was about 1.4%. In the reactions with ammonia base lignosulfonates losses up to 0.5–0.9% of organically bound sulfur occurred. (It is believed that the amount would have been more is a more purified ammonia-base lignosulfonate material had been used since LIGNOSITE and ULTRAMIX lignosulfonates, for example, are about 80 and 90%, respectively, in lignosulfonate contents.

It is event from Table 6 that the amount of desulfonation occurring in kraft lignin (REAX 85A) upon reaction with nitrite is very low (only 0.17%). This is far lower from that which occurs with any of base lignosulfonate reaction products and is indicative of the low reactivity of this material with respect to nitrite oxidation. This tends to support the experimental findings that kraft liquor materials are not particularly useful as resources for nitrite oxidation compared to base lignosulfonate materials.

The following Table 7 (A and B) is intended to illustrate the effect on the lignosulfonate ULTRAMIX reacted with varying amounts of sodium nitrite at the reaction conditions. Table 8 which follows illustrates the effect of reacting kraft black liquor itself with sodium nitrite.

TABLE 7

Reaction of Ultramix at Varying Sodium Nitrite, and Starting Solids Levels[a]

| | ULTRAMIX | | | REACTION PRODUCT | | | GYPSUM DISPERSION % ABOVE CONTROL | |
|---|---|---|---|---|---|---|---|---|
| Lot No. | Sodium Nitrite,[b] % | Starting Solids,[c] % | Starting pH[c] | Visc. 20° C., cps | pH | Solids, % | 0.1%[d] | (Eff.)[e] |
| | | | | 7A | | | | |
| 7A | 7.5 | 29.0 | 10.0 | 86 | 9.4 | 29.9 | 24.4 | (99) |
| 1B | 1.0 | 34.0 | 10.0 | 85 | 9.2 | 34.1 | 20.6 | (83) |
| 7B | 2.0 | 29.0 | 10.0 | 22 | 9.2 | 29.2 | 20.6 | (83) |
| 7C | 2.0 | 32.0 | 10.0 | 75 | 9.2 | 32.4 | 20.9 | (85) |
| 7D | 1.0 | 29.0 | 10.0 | 20 | 9.1 | 29.2 | 19.5 | (79) |
| 7E | 0.0 | 29.0 | 8.8 | 17 | 8.8 | 29.4 | 17.6 | (71) |
| DILOFLO GL | — | — | — | — | — | — | 24.7 | — |
| | | | | 7B | | | | |
| 7F | 5.0 | 32.0 | 10.0 | 348 | 9.4 | 32.3 | 21.4 | (94.3) |
| 7A | 7.5 | 29.0 | 10.0 | 86 | 9.4 | 29.9 | 21.4 | (94.3) |
| DILOFLO GL | | | | | | | 22.7 | |

[a]Reactions carried out at 165–167° C. for 45 minutes (about 20 minutes to temperature).
[b]Amount added based on weight of Ultramix solids.
[c]Starting solids of Ultramix solution before addition of solid NaNO₂, and 50% NaOH to adjust pH to starting pH level shown.
[d]Dosage rate, % product solids on stucco.
[e]% Efficiency compared to Diloflo GL (see previous definitions).

TABLE 8

Reaction of Kraft Black Liquor with Sodium Nitrite at Varying Starting Solids Levels[a]

| | Kraft Black Liquor | | Reaction Product | | | Gypsum Dispersion |
|---|---|---|---|---|---|---|
| Lot No. | Starting Solids, %[b] | pH | Visc. 20° C., cps | Visc. 20° C., cps | pH | Solids, % | % Above Control at 0.1%[c] |
| 8A | 35.0 | 13.5 | — | 17.5 | 13.5 | 37.4 | 6.7 |
| 8B | 42.0 | 13.5 | 50 | 45 | 13.5 | 43.7 | 6.4 |
| 8C | 48.7 | 13.6 | 248 | 235 | 13.7 | 50.0 | 6.7 |
| 8D | 48.7 | 13.6 | — | — | — | — | 6.4 |

[a]7.5% NaNO₂ added based on kraft black liquor solids. Reaction temperature 165–167° C. for 45 minutes (20–25 minutes to temperature).
[b]Starting solids of kraft black liquor before addition of solid NaNO₂.
[c]Dosage rate, % product solids on stucco.

From the above Tables 7 (A and B) it is seen that nitrite oxidized sodium lignosulfonates are very cost effective dispersants for gypsum and like dispersions. Such dispersants are obtained only upon proper nitrite oxidation where the amount of sodium nitrite used is about 4.5% desirably 5.0%, and above based on lignosulfonate solids (at lower sodium nitrite reactant level higher amounts of solids are needed to achieve approximately the same dispersion efficiency). About 7.5% of sodium nitrite used indicates a preferred usage level. Although higher amounts may be used e.g. up to 10% and even 20% (Cf. Lot 1C—Example 1)—these amounts are not cost effective for such bulk material as lignosulfonates and also increase the viscosity. It is noted that, if the viscosity of the products (Lot 7F, Table 7-B) is allowed to increase such as over prolonged period of standing, then the product may not be as desirable. Hence, the viscosities are preferred to be below 100 cps (as defined herein) although higher ranges are useful as shown in Table 7-B. In the absence of any sodium nitrite the dispersion efficiency is markedly lower. The dispersion standard used has been the previous standard DILOFLO GL described above. When comparing Tables 7 and 8 it is seen that sodium nitrite treatment of kraft black liquor does not seem to indicate any satisfactory results. When kraft black liquor is treated and used as a dispersant for gypsum, no benefit seems to result from such treatment of kraft process based liquors.

As another aspect of the invention, a product corresponding to Lot 1A was also evaluated as a dye dispersant for commercially available dyes—both disperse dyes and vat dyes—and as a replacement for commercially available lignins used for that purpose.

Disperse dyes are non-soluble azo or anthraquinone based dyes applied to the fiber material as a dispersion. Vat dyes are mostly anthraquinone dyes applied as a solution. These dyes are well know and are typically referred to by the Color Index number for these (C.I. No.).

PRIMARY DYE DISPERSANT TESTING

Products prepared as a result of this nitrite oxidation technology, offer superior potential as a primary dye dispersants. As a candidate product, a nitrite oxidized ULRAMIX product prepared under optimum conditions (Example 1A) was selected. Simple screening tests such as fabric staining and azo dye reduction tests (but not actual dye dispersion tests themselves) established the 1A product to be the most likely candidate. It was subjected to comprehensive testing as a primary dye dispersant utilizing the tests described below. It is noted that the example illustration is intended to show the potential for all suitable novel products.

It was compared alongside REAX 85A (Westvaco Corporation of Example 4), a widely used industry standard for disperse dyes, and against Marasperse CBSO-4 (available from Daishowa-Reed Company, Greenwich, Conn.), an industry standard for vat dyes. The specific product evaluated was Lot 1A-3, prepared in a manner similar to that used to prepare Example 1, Lot 1A. The product was spray dried to prepare a solid, powder product with a moisture content of 3.53% (prior to testing).

Comparison with Reax 85-A in Disperse Dyestuffs—Reax 85-A is produced by sulfonmethylation of kraft lignin and is considered the commercial lignosulfonate of choice. It is available from Westvaco, New York, N.Y. The product of the invention was compared at equal use rates.

| A) Without dye addition: Physical Properties | | |
|---|---|---|
| Dispersant | Reax 85-A | Lot 1A-3 |
| 1. Foam Test-Initial | 340 ml | 68 |
| Foam Test-2 Minutes | 108 ml | 6 |
| 2. Transmission: Absorbance at 380 nm | .4578 | .3494 |

| B) Reduction Evaluation - Disperse Blue Color Index No. 165:1 | |
|---|---|
| | % Strength |
| Standard without heating and non-reducing dispersant (dye only) | 100.0 |
| Standard with heating (shows reduction) | 93.2 |
| Lot 1A-3 dispersant | 70.6 |
| Reax 85-A (Prior Art) | 65.7 |
| Heating is at 265° F. under pressure. | |

TABLE 9

Disperse Dye Performance and Physical Characteristics of Dispersion-Disperse Blue (C.I. No. 79)

| | Reax 85-A | Lot 1A-3 Dispersant |
|---|---|---|
| Dispersion Test (filtering time) | 27 Seconds | 12 Seconds |
| pH | 9.7 | 9.2 |
| Viscosity | 40 cps | 30 cps |
| Specking* | 4/5 | 5 |
| Foam Initial | 50.8 ml | 16.9 ml |
| Foam-after 2 minutes | 25.4 ml | 8.5 ml |
| Strength (%) intensity of color | 100 | 98.8 |

*1 - Poorest
5 - Best

Grinding times were the same with both dispersants.

TABLE 10

Comparison with Marasperse CBOS-4[1] in Vat Dyes (CBOS-4- a sulfomethylated lignosulfonate, i.e. oxy-lignin material residue from oxidation of lignin Vat Black (Color Index No. 25)

| | CBOS-4 | Lot 1A-3 Dispersant |
|---|---|---|
| Dispersion Test (filtering time) | 8 seconds | 6 seconds |
| pH | 8.9 | 9.4 |
| Viscosity | 30 cps | 270 cps |
| Specking | 5 | 5+ |
| Foam[2]-Initial | 6.8 ml | 8.5 ml |
| Foam[2]-after 2 minutes | 1.7 | 1.7 |
| Strength % | 100 | 98.2 |

[1]Available from Daishowa-Reed of Greenwich, CT.
[2]The industry standard for vat dyes AATCC-method DD-9B (Klopman Foam Test)

From the above data it is seen that the dispersants of this invention are better than the prior art dispersants.

The above test data show that not only is the Lot 1A-3 dispersant an excellent non-reducing dispersant with a highly reduction prone dye Disperse Blue C.I. No. 165:1, but the dispersant is also useful for vat dyes. Such cross-over capability is not displayed for REAX 85-A which cannot be used in vat dyes because of unacceptably high viscosity. In the above tests for any dispersant, lower viscosity is desirable especially for disperse dyes. Low foaming is equally desirable.

"Specking" in the above tests is defined as degree of agglomeration after dispersion and is determined by appearance of the filter cloth after the dispersion test. It also measures stability of the dispersion.

"Strength" means intensity of color and indicates reduction.

In the test for Vat Black (C.I. No. 25) the higher viscosity for Lot 1A-3 dispersant shows, however, a finer grind (which may increase viscosity) yet it is noted that filtering time is less which indicates excellent dispersion.

The above tests are based on AATCC (American Association of Textile and Colorant Chemists) tests but are more severe e.g. for filtering.

While we have demonstrated the novel and outstanding properties for the novel compounds, it is evident that these have a number of applications as dispersants and for other purposes; however, the invention is sought to be defined by the claims herein and by the reasonable scope of these claims.

What we claim is:

1. An elevated temperature nitrite-oxidized lignosulfonate wherein said lignosulfonate is selected from at least one member of the group consisting of ammonia base lignosulfonate, sodium base lignosulfonate, calcium base lignosulfonate and magnesium base lignosulfonate, wherein said oxidized lignosulfonate has a pH of above 7, a molecular weight between about 6,000 Mw and about 100,000 Mw, and wherein said elevated temperature oxidation is in an alkaline aqueous reaction medium between 100° C. and about 200° C. and at an autogenous pressure for a temperature between 100° and about 200° C.

2. The nitrite oxidized lignosulfonate as defined in claim 1 wherein a bound nitrogen content of said lignosulfonate is from above 0.0% to about 0.5% maximum on a weight basis.

3. The nitrite oxidized lignosulfonate as defined in claim 1 wherein said nitrite oxidized lignosulfonate has 0.3% to 1.8% reduced amount of organically bound sulfur, by weight, with respect to an unoxidized starting material.

4. The nitrite oxidized lignosulfonate as defined in claim 1 wherein the same is an ultrafiltered lignosulfonate and is a sodium base lignosulfonate.

5. The nitrite oxidized lignosulfonate as defined in claim 4 wherein said lignosulfonate is from coniferous wood species and is from spent sulfite liquor.

6. The nitrite oxidized lignosulfonate as defined in claim 1 wherein the lignosulfonate is an ammonia base lignosulfonate.

7. The nitrite oxidized lignosulfonate as defined in claim 1 wherein the lignosulfonate is an ultrafiltered lignosulfonate.

8. The nitrite oxidized lignosulfonate as defined in claim 1 wherein a sulfur content expressed as sulfur by weight in said nitrite oxidized lignosulfonate is between about 3.5% to 6.6%, a sulfate content expressed as sulfur between about 0.5% to 1.6% by weight, and organically bound sulfur between about 2.5% and 5.1% by weight.

9. The nitrite oxidized lignosulfonate as defined in claim 1 wherein the same is an ultrafiltered lignosulfonate prior to nitrite oxidation.

10. The nitrite oxidized lignosulfonate as defined in claim 1 wherein the same is a nitrite-oxidized lignosulfonate prior to ultrafiltration.

11. The nitrite oxidized lignosulfonate as defined in claim 1 wherein the same is in a solution from about 10% to about 70%, by weight, based on the lignosulfonate material weight, on an oven dry basis, with reference to a total solution weight.

12. The nitrite oxidized lignosulfonate as defined in claim 1 wherein the same is in a solution in a concentration from about 25% to about 40%, based on the lignosulfonate weight, on an oven dry basis, with reference to a total solution weight.

13. A method for making an oxidized lignosulfonate derivative comprising the steps of oxidizing a base-containing lignosulfonate material, said material being selected from the group consisting of ammonia, sodium, calcium, and magnesium base lignosulfonate material and mixtures thereof; wherein said oxidizing is of said lignosulfonate material in an alkaline aqueous reaction medium in the presence of a nitrite at a temperature between about 150° C. and about 170° C. at a pressure of up to about 150 psi (gage) including intermittently relieved pressure.

14. A method in accordance with claim 13 wherein the temperature is from about 165° C. to about 170° C.

15. A method in accordance with claim 13 wherein the oxidizing is conducted at pH from about 7 to about 14.

16. A method in accordance with claim 15 wherein the pH is from about 9 to about 10 and the nitrite is sodium nitrite.

17. A method in accordance with claim 13 wherein sodium nitrite is initially present in an amount from about 1.0 percent to about 20 percent, by weight, based on the weight of lignosulfonate material on an oven dry basis.

18. A method in accordance with claim 13 wherein sodium nitrite is initially present in an amount of about 7.5 percent, by weight, based on the weight of lignosulfonate material on an oven dry basis.

19. A method in accordance with claim 13 wherein the lignosulfonate material is present in solution concentration from about 10 percent to about 70 percent based on the lignosulfonate material weight, on an oven dry basis, to total solution weight.

20. A method in accordance with claim 13 wherein the lignosulfonate material is present in solution concentration from about 25 percent to about 40 percent based on the lignosulfonate material weight, on an oven dry basis, to total solution weight.

21. A method in accordance with claim 13 wherein the lignosulfonate material is present in a concentration sufficient to provide a final product viscosity of about 60 to about 100 centipoise at 20 degrees Celsius.

22. A method in accordance with claim 13 wherein the method further comprises ultrafiltering the material resulting from the nitrite oxidation to remove low molecular compounds of molecular weight below about 6,000 $\overline{Mw}$.

23. A method in accordance with claim 13 wherein the method further comprises ultrafiltering the lignosulfonate material prior to the nitrite oxidation to remove low molecular weight components of molecular weight below 6,000 $\overline{Mw}$.

24. A method in accordance with claim 13 wherein the nitrite oxidation is conducted for a period of about 5 minutes to about 5 hours.

25. A method in accordance with claim 13 wherein the nitrite oxidation is conducted for a period of about 45 minutes.

* * * * *